C. A. DIES.
PROCESS OF MAKING PIPE FITTINGS.
APPLICATION FILED SEPT. 30, 1909.
1,182,358.
Patented May 9, 1916.
5 SHEETS—SHEET 1.
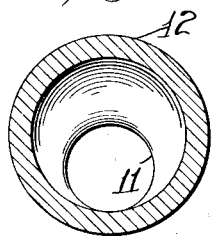
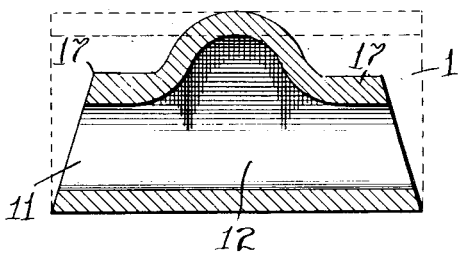
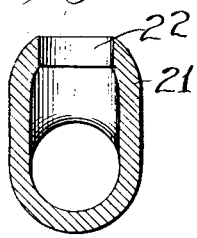
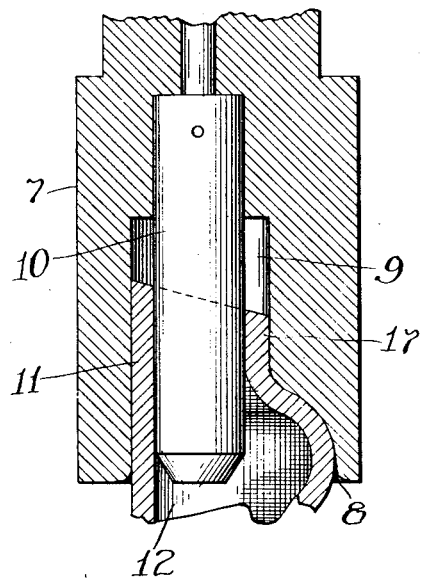
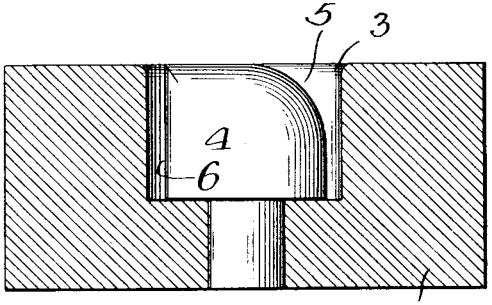
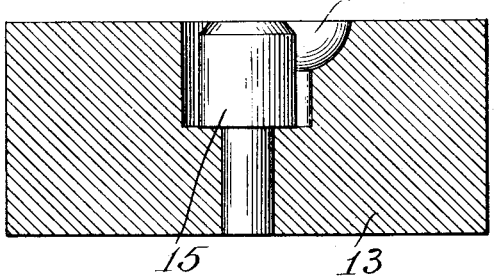
Witnesses:
R. A. White
H. R. L. White
Inventor:
Charles A. Dies.
By W. W. Withenbury, Atty.

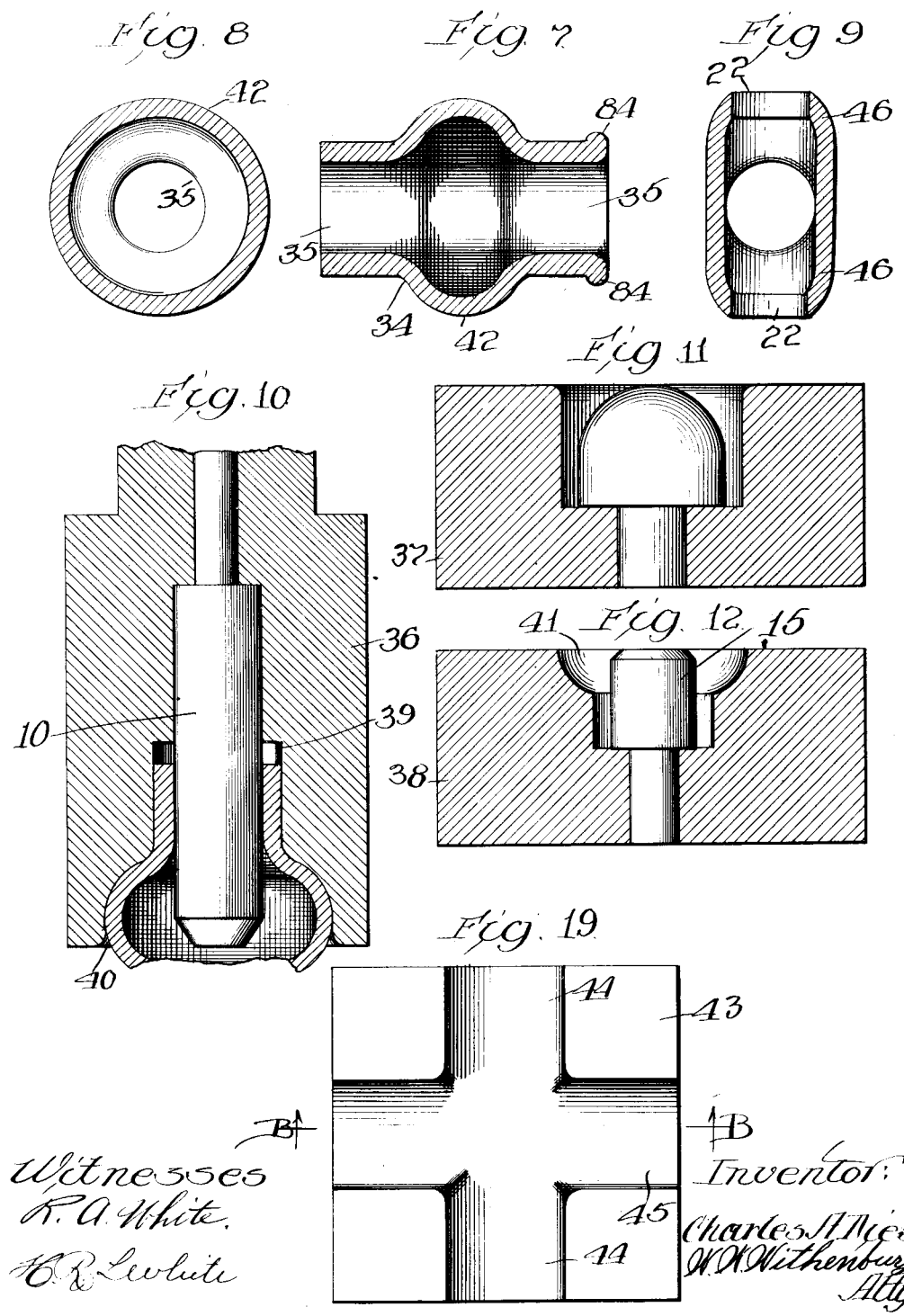

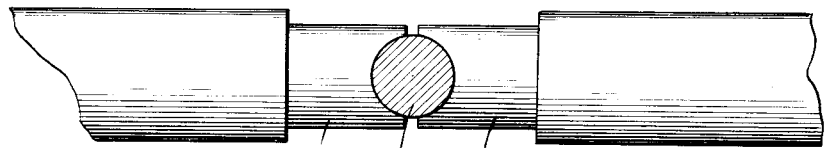
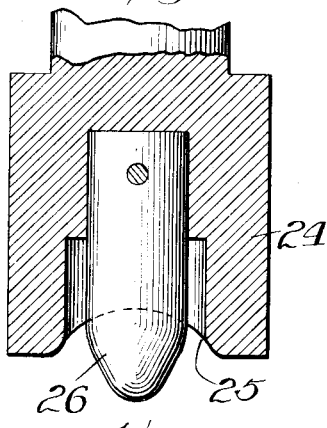
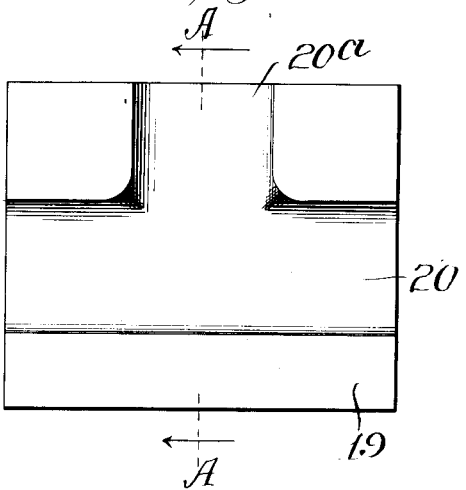
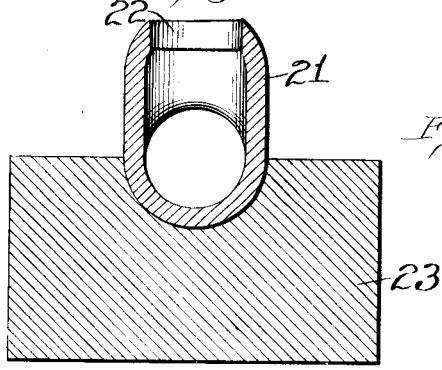
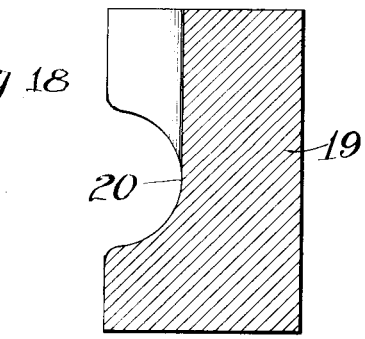

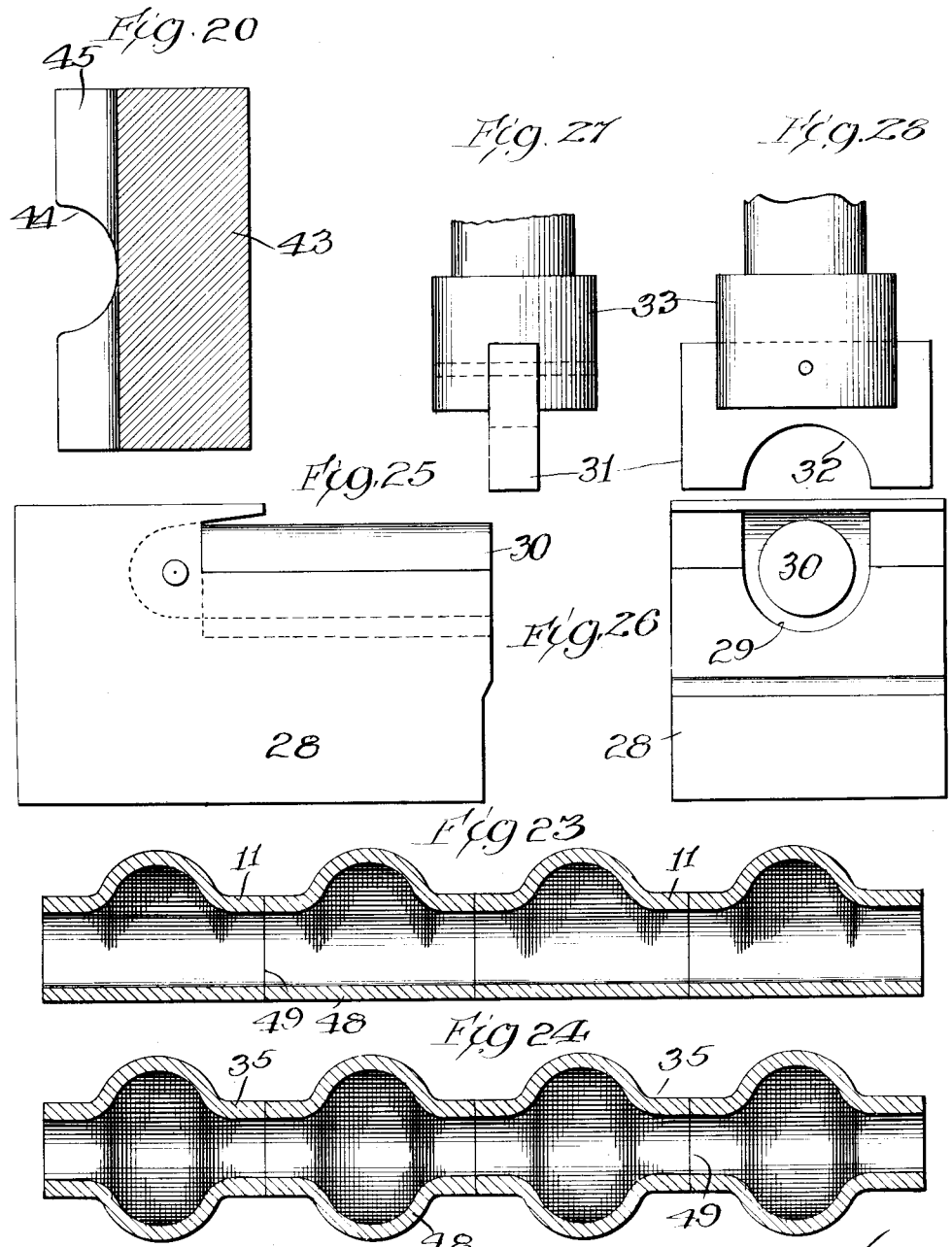

C. A. DIES.
PROCESS OF MAKING PIPE FITTINGS.
APPLICATION FILED SEPT. 30, 1909.

1,182,358.

Patented May 9, 1916.
5 SHEETS—SHEET 5.

Witnesses
R. A. White.
H. C. Rolletule

Inventor
Charles A. Dies
By W. W. Withenbury Atty

UNITED STATES PATENT OFFICE.

CHARLES A. DIES, OF CHICAGO, ILLINOIS, ASSIGNOR TO CLAYTON MARK, OF LAKE FOREST, ILLINOIS.

PROCESS OF MAKING PIPE-FITTINGS.

1,182,358.     Specification of Letters Patent.     Patented May 9, 1916.

Application filed September 30, 1909. Serial No. 520,256.

*To all whom it may concern:*

Be it known that I, CHARLES A. DIES, a citizen of the United States, and a resident of the city of Chicago, in the county of Cook and State of Illinois, have invented a new and useful Improvement in the Process of Making Pipe-Fittings, of which the following is a complete specification.

The main objects of this invention are to provide an improved process by means of which pipe fittings may be made with greater rapidity and with less cost than has heretofore been possible; to provide a process of making pipe fittings from seamless tubing, whereby the strength of the stock is increased during the operation, so that the stock or blank may be of less strength, and consequently of less weight, than would be necessary if the process tended to decrease the strength of the material; and to provide a process whereby pipe fittings are produced which have a considerably less weight than cast fittings of the same sizes, and which are of as great or greater strength than such cast fittings.

The invention comprises the matter hereinafter described in the specification and more fully pointed out and defined in the appended claims.

Figure 29:
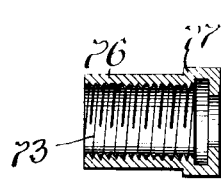
Figure 33:
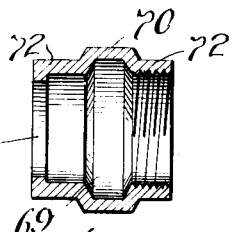
Figure 31:
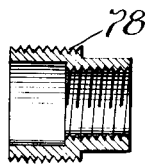
Figure 30:
Figure 34:
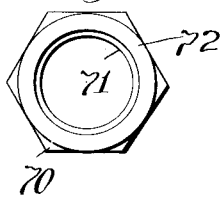
Figure 32:
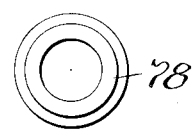
Figure 35:
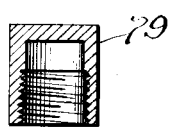
Figure 37:
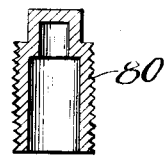
Figure 36:
Figure 38:
Figure 21:
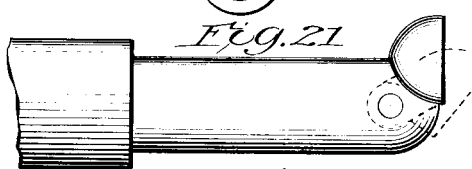
Figure 22:
Figure 39:
Figure 40:
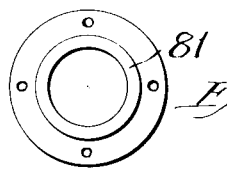

In the drawings: Figure 1 is a longitudinal section of a blank for a T after the first operation, or that of reducing the ends, and also showing in dotted lines the shape of the original blank. Fig. 2 is a central, transverse section of Fig. 1. Fig. 3 is a similar section of the T after the second and third, or flattening and drilling operations have been performed. Fig. 4 is a fragmentary section of the die punch employed in the first, or reducing, operation on T's, and showing the pilot in side elevation. Fig. 5 is a section of the die employed when reducing the first end of a T, with the pilot in side elevation. Fig. 6 is a similar view of the die employed when reducing the second end of the T. Fig. 7 is a longitudinal section of a blank for a cross after the first, or reducing, operation, and showing one end upset to form a strengthening bead. Fig. 8 is a central transverse section of the same. Fig. 9 is a transverse section after the second and third, or flattening and drilling, operation have been performed. Fig. 10 is a fragmentary section of the die punch for performing the reducing operation on crosses, and showing the pilot in side elevation. Fig. 11 is a section of the die employed when reducing the first end of a cross. Fig. 12 is a similar view of the die employed when reducing the second end of a cross. Fig. 13 is a fragmentary, side elevation of the arbor employed during the second, or flattening, operation on T's and crosses. Fig. 14 is a fragmentary, side elevation of the arbor employed when forming or sizing the lateral projections of T's and crosses, after the drilling operation. Fig. 15 is a fragmentary view, partly in section and partly in side elevation, of the sizing punch employed in finishing the lateral projections of T's and crosses, after the drilling operation. Fig. 16 is a transverse section of the die employed when sizing the lateral projections of T's, and with a T shown therein. Fig. 17 is a plan view of one half of the die employed for flattening T's. Fig. 18 is a section taken on line A—A of Fig. 17. Fig. 19 is a plan view of one half of the die employed when flattening crosses. Fig. 20 is a section taken on line B—B of Fig. 19. Figs. 21 and 22 are side elevations of the arbor employed for finishing or truing the interior surfaces of the bends of T's and crosses. Fig. 23 is a longitudinal section of a blank, after the reducing operation has been performed, from which a plurality of T's are formed by swaging. Fig. 24 is a view, similar to Fig. 27, of a blank for making a plurality of crosses by swaging the blank to form the reductions. Fig. 25 is a side elevation of the die and arbor used when trimming the ends of T's. Fig. 26 is a front elevation of the same. Fig. 27 is an end elevation of the knife employed for trimming the ends of T's. Fig. 28 is a front elevation of the same. Figs. 29 and 30 are a longitudinal section and an end elevation, respectively, of the swivel member of a union. Figs. 31 and 32 are like views of the fixed member of a union. Figs. 33 and 34 are a longitudinal section and an end elevation, respectively, of the coupling member of a union. Figs. 35 and 36 are a longitudinal section and an end elevation, respectively, of a cap. Figs. 37 and 38 are a longitudinal section and an end elevation, respectively, of a plug. Figs. 39 and 40 are a longitudinal section and an end elevation, respectively, of a flange fitting.

As shown in said drawings, referring first to the process of forming T's, a section or blank 1 of steel or any other preferred tubing is provided, which blank is of the proper length to form the T, and is of uniform diameter, as shown in dotted lines in Fig. 1. Said tubing may be of any desired construction, but preferably tubes drawn from sheet steel are used.

In forming the T's one end of the blank 1 is placed in a holding die 2, which has a central seat 3 therein, of a size and shape to fit closely about the blank. A pilot 4 is carried axially of said seat, and at its outer end is preferably rounded on one side, as at 5, as shown in Fig. 5. The rounded portion of the pilot permits the blank to be readily inserted in the die, and the straight side 6 of the pilot prevents any buckling of the adjacent side of the blank when the opposite end of the blank is being formed.

The die punch 7 has a circular mouth 8 of an outer diameter a trifle larger than the outer diameter of the blank. Said mouth narrows or tapers inwardly on all sides but one, and terminates in a restricted, cylindrical throat 9, which has one side in alinement with the straight side of the mouth. Carried in said throat is a pilot 10 of a diameter approximately equal to the internal diameter of the reduced end of the T. The pilot 10 is spaced a sufficient distance from the straight side of the mouth 8 to permit the blank to enter between the same and said side and to prevent the adjacent or unreduced side from buckling. Said die punch 7 is forced upon the free or protruding end of the blank 1, and the tapering wall of the mouth reduces the diameter of the end of the blank, and causes said end to enter the throat 9. The reduction of said end takes place on all sides but one of the blank, and as a consequence the reduced portion 11 is axially off center with the central portion 12 of the blank. The blank is then removed from the die 2 and the reduced end is placed in a die 13, which has a seat 14 therein adapted to conform to the external shape of said reduced end. A pilot 15 is carried in said seat and acts to prevent buckling of said end while the other end is being operated upon by the die 7.

Of course with heavy stock, or where the reduction is comparatively great, a number of dies 7, having varying sized throats, may be employed to bring the end down to the desired diameter. The portions 17 of the blank which are displaced in the reducing operation are naturally thickened slightly, with the result that the strength of said portions is thereby increased.

After the ends have been reduced the blank is placed upon an arbor 18, shown in Fig. 13, which arbor is of a diameter to fit closely in said reduced ends. Complemental dies 19, each having a T shaped seat 20 therein, are then brought against the sides of the blank, and the blank is flattened centrally, as shown in Fig. 3, thereby forming the lateral projection or stem 21 of the T. The stem 20$^a$ of the seat is of the same depth as the remainder of the seat but is broader to permit the stem to flatten. The outer end of the stem 21 is then drilled to provide the bore 22, and the blank is placed in a die 23, with the stem 21 extending upwardly or outwardly from the die. A sizing punch 24 having a cylindrical mouth 25, and having a pilot 26 adapted to enter the bore 22 is then brought down upon the stem and trues or finishes the outer surface of the stem by bringing it to a cylindrical form, and said pilot also trues the bore 22. During the sizing operation, arbors 27 are placed in the reduced portions 11 of the blank and their ends are notched to receive the inner end of the pilot 26 when the latter is at the inner limit of its movement.

When reducing the ends of the T's the displacement of the stock causes the blank to shorten on the sides where the displacement takes place and it is necessary to cut off or true the ends. Any desired means may be employed for this purpose, but as shown in Figs. 29 to 32 inclusive, a cutting die 28 is provided, and it has a semi-circular seat 29 therein which opens through the front of the die, and is adapted to receive the blank with its straight side lying on the bottom of the seat, and its end protruding slightly beyond the face of the die. Pivoted on said die 28 and extending longitudinally of the seat 29 is an arbor 30 adapted to extend through the reduced portions of the blank. A knife 31 having a semi-circular bit 32, and supported in a press head 33, is then brought down in close contact with the front face of the cutting die and it cuts off said protruding end of the blank. The reduced ends and the bore 22 of the completed blank may then be screw threaded in the usual or any desired manner.

Referring now to the process of forming crosses such as shown in Figs. 7, 8 and 9, a blank 34 of metal tubing has its ends 35 reduced in diameter by means of dies 36, 37 and 38, which are similar to the corresponding dies 7, 2 and 13 for the T's, with the exception that the throat 39 of the die punch 36 is in axial alinement with the mouth 40, and the seat 41 in the die 38 is formed complementally with one of the reduced ends 35. The reduced portions 35 of the blank are thereby formed in axial alinement with the unreduced central portion 42. After the ends 35 have been reduced the blank is placed on the arbor 18 and it is then flattened between complemental dies 43, to the form shown in Fig. 9. The dies 43 have their cross seats 44, which receive the portion 42 of the blank, of the same depth as the seats 45, which receive the reduced portions 35, but they are slightly broader than said seats 45, so as to permit the portion 42 to flatten. After the flattening operation the lateral projections 46 are drilled and sized or finished the same as the stem 21 on the T.

If preferred the blanks 48 for the T's and crosses may be formed of sufficient length for several T's or crosses, as shown in Figs. 23 and 24, and then placed in a swaging press and swaged down at intervals throughout its length by means of dies which are so shaped that when the blank is laid on one die and the other is brought down thereon they produce the reduced portions 11 or 35. The blanks are then cut along the lines 49 to form the individual fittings, which cutting may be done either before or after the flattening operation.

When forming the fittings from drawn steel tubing the closed ends of the tubes may be conveniently worked up into fittings requiring one closed or partly closed end. In Figs 29 to 34 inclusive are shown a pipe union. The coupling member 69 is formed from a blank of tubing of a diameter equal to the diameter of the large portion 70 of the coupling. The closed end is squared in a suitable die and is punched or drilled to provide the annular flange 71, and the ends 72 of the blank are then reduced in dies similar to those employed in reducing crosses. The swivel connection 73 is formed from a blank having its closed end 74 drilled or punched to provide an opening 75, and then has its open end 76 reduced to provide a shoulder 77 adapted to fit within the flange 71. The stationary connection 78 is formed from a tubular blank having one end reduced in the same manner as for crosses. The different parts of the union may then be threaded in the usual manner. Caps 79, plugs 80, and flange fittings 81, such as shown in Figs. 35 to 40 inclusive, may also be formed from the closed ends of the drawn tubing. The flange fitting 81 being formed by punching out the metal closing the end of the tubing and then expanding the end of the tube and turning it outwardly to form the flange.

If in the formation of T's and crosses, after the reducing and flattening operations have been performed, the central or curved portions are not exactly true, they may be trued by placing arbors 82 therein, each arbor having pivoted thereon a curved section 83, which is normally held at an angle of approximately 45 degrees to the arbor, as shown in dotted lines in Figs 21 and 22. As the arbors approach each other the curved sections contact with each other and are turned to an angle of approximately 90 degrees. The movement of said sections 83 causes them to contact with the curved portions of the fittings and force them into proper shape. If it is desired to form a strengthening bead on the ends of said fittings, the bead may be formed by upsetting the end either cold or hot, as is shown at 84 in Fig. 7.

Obviously pipe fittings made in accordance with my invention may be made of lighter material than can malleable fittings, and still have equal strength. It is also obvious that the fittings may be made with great rapidity and with a minimum amount of manual labor.

I claim:

1. The process of making pipe fittings, comprising reducing the diameter of end portions of a tubular blank, then flattening the unreduced portion of the blank to form a lateral projection, and then truing the lateral projection in dies to bring it to a tubular form.

2. The process of making pipe fittings, comprising reducing the diameter of the ends of a tubular blank, compressing the central portion of the blank from opposite sides and causing it to protrude laterally, then shaping the lateral protrusions to a tubular form.

3. The process of making pipe fittings, comprising taking a tubular blank, reducing the diameter of the end portions of the blank and thickening the walls of said end portions, and then aperturing the central portion and shaping it from without to tubular form.

4. The process of making pipe fittings, comprising reducing the diameter and thickening the walls of the end portions of a tubular blank, and then flattening the central portion of the blank with dies to the desired shape for the fittings and aperturing the central portion.

5. The process of making pipe fittings, comprising placing a tubular blank in dies and reducing the diameter of end portions thereof by substantially radial pressure, and then compressing the unreduced portion in suitable dies, thereby causing the unreduced portion to project substantially at right angles to the axis of the tube.

6. The process of making pipe fittings, comprising reducing the diameter of the ends of a tubular blank, and then forcing one side of the central portion of the blank outwardly by lateral compression to provide a lateral extension.

7. The process of making pipe fittings, comprising reducing the diameter of the ends of a tubular blank by compression, then flattening the central portion of the blank by compression from opposite sides to provide lateral projections at right angles to the force exerted.

8. The process of making pipe fittings, comprising reducing the diameter of the ends of a tubular blank by compression, then flattening the central portion of the blank by compression from opposite sides to provide intermediate lateral projections, and then aperturing the ends of said projections.

9. The process of making pipe fittings, comprising reducing the diameter of non-contiguous portions of a section of seamless tubing, flattening the intermediate portions of the section to provide lateral projections, aperturing said projections and shaping them to a cylindrical form.

10. The process of making pipe connections, comprising reducing the diameter of non-contiguous portions of a section of seamless tubing by means of dies, the walls of said reduced portion being thickened by the reducing operation, flattening the intermediate portions of the section to provide lateral projections, drilling the closed ends of said projections, and then placing the blank in dies and shaping projections to a cylindrical form.

11. The process of forming T's and crosses, comprising reducing the ends of a tubular blank, placing the blank in dies and flattening the central portion from opposite sides to a size not greater than the diameter of the reduced ends and forming lateral projections, and then forming the lateral projections to tubular form.

12. The process of forming pipe fittings, comprising reducing the ends of a tubular blank by substantially radial pressure, flattening the unreduced portion to form a central lateral projection, and then aperturing the same and truing the projection to a cylindrical form.

13. The process of forming pipe fittings, which consists in uniformly and simultaneously compressing a portion of a seamless tube to reduce that portion, and causing the metal thus displaced to flow into and strengthen the throat connecting the reduced and the unreduced portions of the fitting.

14. The process of making pipe fittings, which consists in taking a tubular blank, reducing the diameter of its ends by causing a peripheral flow of the metal, thereby thickening the walls of the tube along the contracted portion and forming thereon a lateral projection having thickened walls.

15. The process of forming pipe fittings, which consists in taking a tubular blank, applying compression along one side of a tubular blank and reducing the longitudinal dimension of that side by a peripheral flow of the metal, which thickens the walls of the blank along the contracted portion, and forming thereon a projection having thickened walls, and reducing the ends of the blank while the longitudinal dimension of the opposing side remains substantially unchanged.

In testimony whereof I have hereunto subscribed my name in the presence of two witnesses.

CHARLES A. DIES.

Witnesses:
W. W. WETHENBURY,
E. R. WALKER.